United States Patent [19]

Kishima et al.

[11] Patent Number: 4,828,771

[45] Date of Patent: May 9, 1989

[54] METHOD OF PRODUCING POROUS MATERIAL HAVING OPEN PORES

[75] Inventors: Noboru Kishima; Akio Matsumoto, both of Kitakyushu, Japan

[73] Assignee: Toto Ltd., Kitakyushu, Japan

[21] Appl. No.: 88,150

[22] Filed: Aug. 21, 1987

[30] Foreign Application Priority Data

Sep. 27, 1986 [JP] Japan .................................. 61-218626

[51] Int. Cl.$^4$ .......................... C08J 9/28; C08G 59/60
[52] U.S. Cl. .................... 264/41; 264/331.12; 264/DIG. 13; 521/64; 521/128; 521/178; 528/111; 528/123
[58] Field of Search .................. 264/41, DIG. 13; 521/64, 128, 178; 528/111, 123

[56] References Cited

U.S. PATENT DOCUMENTS

| | | | |
|---|---|---|---|
| 3,057,809 | 10/1962 | Newey | 521/178 X |
| 3,075,932 | 1/1963 | Edwards et al. | 528/123 X |
| 3,275,587 | 9/1966 | Weller et al. | 521/178 X |
| 3,310,529 | 3/1967 | Marti et al. | 528/123 |
| 3,634,322 | 1/1972 | Ruf et al. | 528/123 |
| 3,705,116 | 12/1972 | Vargiu et al. | 521/178 X |
| 3,705,117 | 12/1972 | Vargiu et al. | 521/178 X |
| 3,726,819 | 4/1973 | Dijkhuizen | 521/178 X |
| 3,825,506 | 7/1974 | Carter | 521/64 X |
| 3,914,204 | 10/1975 | Helm et al. | 528/123 X |
| 3,966,653 | 6/1976 | Blunt et al. | 521/178 X |
| 4,420,606 | 12/1983 | Waddill | 528/111 |
| 4,464,485 | 8/1984 | Kishima et al. | 521/64 |
| 4,480,082 | 10/1984 | McLean et al. | 528/111 X |
| 4,594,291 | 6/1986 | Bertram et al. | 528/111 X |

FOREIGN PATENT DOCUMENTS 53-2464  1/1978  Japan ...................................... 264/41

Primary Examiner—Philip Anderson
Attorney, Agent, or Firm—Oblon, Fisher, Spivak, McClelland & Maier

[57] ABSTRACT

A method of producing a porous material having open pores comprises the steps of preparing an emulsion slurry by vigorously agitating a mixture comprising (i) a glycidyl type epoxy resin, (ii) a first hardener selected from the group consisting of modified polyamine hardeners each being prepared by modifying a polyamine hardener with a modifier, amine hardeners and mixtures thereof, (iii) a second hardener selected from the group consisting of polyamide hardeners, (iv) a filler and (v) water, casting said slurry in a water-impermeable mold, and hardening said slurry while it contains water. A large size molded product having a complicated contour and having open pores whose average pore diameter ranges from 0.2 to 10 microns can be produced with high dimensional accuracy.

19 Claims, No Drawings

METHOD OF PRODUCING POROUS MATERIAL HAVING OPEN PORES

BACKGROUND OF THE INVENTION

The present invention relates to a method of producing a porous material having open pores. More particularly, the invention is concerned with a method of producing a porous material having open pores from a mixture which comprises (i) a glycidyl type epoxy resin, (ii) a first hardener selected from the group consisting of modified polyamine hardeners each being prepared by modifying a polyamine hardener with a modifier, amine hardeners and mixtures thereof, (iii) a second hardener selected from the group consisting of polyamide hardeners, (iv) a filler and (v) water.

Hitherto, for producing a porous material having open pores for use as a filtering medium, air diffusion medium, casting mold, carrier for catalyst and so forth, various methods have been proposed such as sintering of metal powder, sintering of powdered thermoplastic resin, sintering of inorganic powder, hydration setting of cement or the like, pressing or stamping of a mixture of a thermosetting resin and a filler, hardening of a resin liquid containing pore-forming agent followed by the removal of the pore-forming agent by dissolving, extraction or evaporation, use of a foaming agent, and polymerization for hardening of a W/O emulsion of, example, a polyester resin followed by evaporation of water from the hardened mass.

These known methods of producing porous material having open pores, however, encountered one or more of the following problems in connection with the manufacturing process. First of all, it is to be pointed out that these known methods impractically limit or restrict the shape and size of the product. In addition, these methods often require a heat treatment at high temperature, as well as press work at high pressure. The method which makes use of the pore-forming agent require a step of heating or vacuum operation for the removal of the pore-forming agent by evaporation. Furthermore, these known methods have disadvantages in that it is difficult to control the pore size or pore diameter, or that the production steps involved therein are generally complicated and difficult to conduct.

Among the aforementioned problems, the control of the pore size or pore diameter is a particularly important problem for the following reasons. (i) For instance, when the porous material having open pores is used as a material for a filtering medium or casting mold, the principal function thereof is to separate the particles contained in a fluid flowing therethrough into a first group which passes through the pores of the porous material and a second group which does not pass through the pores of the porous material. This function is determined principally by the diameter of the pores of the porous material. (ii) On the other hand, when the porous material having open pores is used as a material for air diffusion medium, the size of air bubbles and the required pressure for forming air bubbles, which are the two important parameters in operation, are determined by the diameter of the pores of the porous material. (iii) When the porous material having open pores is used as a carrier for a catalyst, the contact surface area of the catalyst is determined by the pore size of the porous material, the contact surface area of the catalyst being the most important factor governing the catalytic action. By the use of the aforementioned known methods, it is quite difficult to control the pore size for the following reasons.

In the production of a porous material from metal powder by sintering, it is difficult to obtain a pore size smaller than 5 microns because of a specific relation existing between the particle size of the metal powder and the surface energy during the sintering step. Consequently, it is quite difficult to effect control of the pore size to obtain pores on the order of 1 micron or so.

Likewise, in the resin powder sintering method or the inorganic powder sintering method, it is difficult to control the packing density at the molding step although the particle size of the used resin powder or inorganic powder may be controlled. In addition, these known methods suffer from a large change in the pore structure at the sintering step, leading to the result that the pore size is distributed over a wide range to hinder the control of the pore size.

As regards the method of mixing a filler with a thermosetting resin followed by pressing or stamping of the mixed material, it is difficult to control the pore size uniformly throughout a product having complicated shape due to uneven molding pressure applied on the different parts of the molded mass or uneven packing of the mixed material, or due to uneven distribution of the thermosetting resin in the mixed material.

In the case of the hydration hardening of a cement or gypsum, a difficulty is involved in the control of the nucleation and growth of the crystals of the hydrate, and precise control of the mean pore size to obtain pores having an average pore diameter on the order of 0.2 to 10 microns cannot easily be effected.

With regard to the method in which the pore-forming agent is evaporated and removed from the hardened resin containing the pore-forming agent, a technique has been proposed for the production of a thin film having pores having an average pore diameter ranging from 0.01 to 0.1 micron. This method, however, cannot be applied to the production of a product having considerably large size and thickness. In the method in which a resin in the form of an emulsion type is hardened followed by the evaporation or extraction of the dispersoid, it is not easy to control the size of the dispersoid, and many disconnected or closed pores are inevitably formed. The control of the pore sizes on the order of 0.2 to 10 microns as a mean is also difficult in this method.

In order to overcome the aforementioned problems and to produce a large porous product having open pores and relatively complicated shape, an improved method has been proposed by Japanese Patent Publication No. 2464/1978 whereby a porous material having precise dimensions and open pores of desired diameter can be produced. This improved method known from the prior patent publication comprises the steps of preparing an O/W emulsion slurry from a mixture containing a glycidyl type epoxy resin, a polymeric fatty acid polyamide hardener, a filler and water, casting the slurry in a water-impermeable mold, hardening the slurry while it contains water, and dehydrating the hardened mass, whereby the desired object is attained.

According to the method known by Japanese Patent Publication No. 2464/1978, the pore size of the porous material having open pores may be controlled by varying the particle size of the filler, by varying the added amount of the reactive diluent, or by varying the mixing ratio of the epoxy resin, hardeners, filler and water. However, the pore size cannot be controlled within a wide range, since the variable range of the amount of reactive diluent and the variable range of the mixing ratio of the epoxy resin, hardeners, filler and water are limited in view of the contraction or shrinkage at the hardening step and the need to satisfy the required strength of the hardened product. It is thus necessary that the particle size of the used filler be varied in order to control the pore size within the range of 0.5 to 10 microns. However, the strength of the hardened product is disadvantageously lowered when a filler having coarser particle size is used. On the other hand, if the content of water in the slurry is decreased to prevent reduction in strength, the viscosity of the slurry becomes high. A further disadvantage of the use of a coarser filler is that the filler particles suspended in the slurry tend to precipitate to lower the operability.

In order to solve the aforementioned problems and to provide a method of producing a porous product having open pores and having a large and complicated shape with good accuracy in dimension, U.S. Pat. No. 4,464,485 discloses a method of producing a porous material having open pores having an average pore diameter of more than 1.5 microns. In this known method, the desired object is attained either (i) by the use of a hardener which is obtained by changing the mixing ratio of an amide compound obtained through a reaction between a monomeric fatty acid and an ethyleneamine represented by the formula of $H_2N$—$(CH_2$—$CH_2$—$NH)_n$—$H$ where "n" is 3 to 5, and a polymeric fatty acid polyamide obtained through a reaction of a polymeric fatty acid and the aforementioned ethyleneamine, or (ii) by the use of a hardener which is obtained by changing the mixing ratio of the monomeric fatty acid and the polymeric fatty acid followed by reacting the fatty acid mixture with the aforementioned ethyleneamine. (This method will be hereinafter referred to as "the method of changing the mixing ratio between monomeric fatty acid and polymeric fatty acid".)

However, "the method of changing the mixing ratio between monomeric fatty acid and polymeric fatty acid" to control the pore size has the following two disadvantages.

(i) In order to produce a hardened product having large size pores by this known method, the ratio of the monomeric fatty acid must be increased. However, a porous product having open pores prepared from such a composition suffers considerable increase in contraction or shrinkage at the hardening step. The upper limit of the pore size is about 5 microns if contraction is to be suppressed within a tolerable range. It is thus difficult to produce a porous product having open pores of larger size and having precisely controlled dimensions. This is the first disadvantage of "the method of changing the mixing ratio beween monomeric fatty acid and polymeric fatty acid".

(ii) In order to produce a hardened product having small size pores by this known method, the ratio of the polymeric fatty acid must be increased. However, the change in pore size of the hardened product is little within the mixing ratio range where the ratio of polymeric fatty acid in the fatty acid mixture is large. Accordingly, the pore size cannot be varied in compliance with the requirement only by changing the mixing ratio between the monomeric fatty acid and the polymeric fatty acid. Subsequently, when it is desired to produce a hardened product having a relatively small pore size, a filler having a small particle size must be used. For the production of hardened products having pore sizes varied within a small pore size range, a number of fillers having different particle sizes must be prepared. However, much time and labor are required for the preparation of fillers having different particle sizes including pulverization of the filler and separation or grading of the pulverized filler particles. When it is intended to vary the pore size of the hardened product by using a single kind of filler and by varying the kind of hardener, the minimum pore size is about 1.5 microns when the single filler is selected so that the maximum pore size obtainable by the use thereof is, for example, about 5 microns. A porous product having pores of smaller pore size cannot be obtained by the use of such a single filler. This is the second disadvantage of "the method of changing the mixing ratio between monomeric fatty acid and polymeric fatty acid".

SUMMARY OF THE INVENTION

Accordingly, the object of this invention is to overcome the various problems as described above and to provide a method of produoing a porous material having open pores whose average pore diameter ranges from 0.2 to 10 microns, and having large dimensions and complicated shape with good accuracy in dimension.

The above object of this invention is attained by the provision of a method of producing a porous material having open pores comprising the steps of preparing an emulsion slurry by vigorously agitating a mixture essentially consisting of (i) a glycidyl type epoxy resin, (ii) a first hardener selected from the group consisting of modified polyamine hardeners each being prepared by modifying a polyamine hardener with a modifier, amine hardeners and mixtures thereof, (iii) a second hardener selected from the group consisting of polyamide hardeners, (iv) a filler and (v) water, casting the slurry in a water-impermeable mold, and hardening the slurry while it contains water.

In the method known from U.S. Pat. No. 4,464,485, a polyamide hardener is solely used as the hardener for the epoxy resin and the pore size is controlled by changing the mixing ratio between the monomeric fatty acid and the polymeric fatty acid used as the starting materials for the polyamide hardener. However, this known method has the two principal disadvantages as described hereinbefore.

In contrast to this known method, we have found that the pore size of the hardened product may be controlled within a wide range without causing increase in contraction or shrinkage of the hardened mass by using, in addition to a polyamide hardener, a modified polyamine hardener prepared by modifying a polyamine hardener with a modifier and/or an amine hardener and by changing the mixing ratio between the polyamide hardener (second hardener) and the modified polyamine hardener and/or amine hardener (first hardener). Based on this finding, we have investigated the influences of the use of various amine hardeners and the influences of the change in combination and mixing ratio of various polyamine hardeners and modifiers affecting on the properties of the hardened porous product having open pores. The present invention has been accomplished in view of the results of our investigations.

DESCRIPTION OF THE INVENTION INCLUDING THE PREFERRED EMBODIMENTS

The present invention provides a method of producing a porous material having open pores comprising the steps of preparing an emulsion slurry by vigorously agitating a mixture comprising (i) a glycidyl type epoxy resin, (ii) a first hardener selected from the group consisting of modified polyamine hardeners each being prepared by modifying a polyamine hardener with a modifier, amine hardeners and mixtures thereof, (iii) a second hardener selected from the group consisting of polyamide hardeners, (iv) a filler and (v) water, casting the slurry in a water-impermeable mold, and hardening the slurry while it contains water.

The polyamine hardener which may be used in this invention is a compound having two or more amine groups in one molecule. Particularly preferred polyamines, which may be used as the polyamine hardener in the method of this invention, include primary amine hardeners each having at least one primary amine group in one molecule, the specific examples being diethylenetriamine, triethylenetetramine, tetraethylenepentamine, pentaethylenehexamine, iminobispropylamine, bis(hexamethylene)-triamine, aminoethylethanolamine, dimethylaminopropylamine, diethylaminopropylamine, methyliminobispropylamine, 1,3-diaminocyclohexane, tetrachloro-p-xylylenediamine, menthenediamine, isophoronediamine, N-aminoethylpiperazine, diaminodiphenyl ether, benzidine, 4,4'-bis(o-toluidine), 4,4'-thiodianiline, m-xylylenediamine, m-phenylenediamine, o-phenylenediamine, dianisidine, methylenebis(o-chloroaniline), 2,4-toluenediamine, bis(3,4-diaminophenyl)sulfone, diaminodiphenylmethane, diaminodiphenylsulfone, diaminoditolylsulfone, 2,6-diaminopyridine, 4-chloro-o-phenylenediamine, 4-methoxy-6-methyl-m-phenylenediamine and m-aminobenzylamine; and secondary amine hardeners which has no primary amine group but has at least one secondary amine group in one molecule, the specific examples being N-methylpiperazine and hydroxyethylpiperazine.

The modifier used for the preparation of the modified polyamine hardener means a compound which reacts with a polyamine hardener to form a modified polyamine hardener having properties different from those of the unmodified polyamine hardener.

Particularly preferable compounds which may be used as the modifier for modifying the polyamine hardener are epoxy compounds each having at least one epoxy ring per molecule. The following are the specific examples of the epoxy compounds which may be used as preferable modifiers for the preparation of the modified polyamine hardeners used in this invention.

(i) Epoxy compounds each having one epoxy ring in one molecule, such as allylglycidyl ether, butylglycidyl ether, styrene oxide, ethyleneoxide, glycidyl methacrylate, octylene oxide, cyclohexenevinyl monoxide, tert-carboxylic acid glycidyl ester, 3-(pentadecyl)phenylglycidyl ether, dipentene monoxide, butylphenoglycidyl ether, pinene oxide, propylene oxide, phenylglycidyl ether and cresylglycidyl ether;

(ii) Epoxy compounds each having two epoxy rings per molecule, such as ethyleneglycol diglycidyl ether, neopentylglycol diglycidyl ether, 1,6-hexanediol diglycidyl ether, vinylcyclohexene dioxide, resorcinoldiglycidyl ether, propyleneglycol diglycidyl ether, butadiene oxide, dimethylpentane dioxide and bisphenol-A diglycidyl ether; and (iii) Epoxy compounds having three epoxy rings per molecule, such as trimethylolpropane triglycidyl ether and 2,6-diglycidyl phenylglycidyl ether.

Another compound which may be used as a preferred modifier is acrylonitrile. The reaction between a polyamine and acrylonitrile is a cyanoethylation reaction.

A further group of preferred modifiers includes combinations of formaldehyde with phenols, such as phenol, cresol, and other phenolic compounds. The reaction product, i.e., a modified polyamine hardener, of the reaction between a polyamine and one of the combinations of this group is a Mannich-type reaction product.

The amine hardener used in the method of this invention is a compound having at least one amine group per molecule. Specific examples of particularly preferable compounds or hardeners will be listed as follows.

(i) Primary amine hardeners each having one or more primary amine groups per molecule, such as diethylenetriamine, triethylenetetramine, tetraethylenepentamine, pentaethylenehexamine, diethylaminopropylamine, menthenediamine, N-aminoethylpiperazine, m-xylylenediamine, m-phenylenediamine, o-phenylenediamine, diaminodiphenylmethane, and diaminodiphenylsulfone;

(ii) Secondary amine hardeners each having one or more secondary amine groups although having no primary amine group, such as N-methylpiperazine, hydroxyethylpiperazine, piperidine, pyrrolidine and morpholine; and (iii) Tertiary amine hardeners each having one or more tertiary amine groups although having no primary and secondary amine group, such as N,N'dimethylpiperazine, N,N,N',N'-tetramethyl-1,3-butanediamine, pyridine, triethanolamine, dialkylaminoethanol, N-methylmorpholine, hexamethylenetetramine, pyrazine, benzyldimethylamine, 2-(dimethylaminomethyl)phenol, quinoline and 1-hydroxyethyl-2-heptadecylglyoxalidine.

The polyamide hardener used in this invention is a reaction product of the reaction between a carboxylic acid and a polyamine. Particularly preferable carboxylic acids are monomeric fatty acids and polymeric fatty acids, and particularly preferable polyamines are alkylenepolyamines.

Preferable monomeric fatty acids are those each having 10 to 22 carbon atoms per molecule. More preferable monomeric fatty acids are oleic acid, linoleic acid and a mixture thereof. Preferable polymeric fatty acids are composed mainly of dimer acids which are produced from tallow oleic acid, tall oil fatty acid, soybean oil fatty acid and so forth. Any one or more monomeric fatty acids may be mixed with one or more polymeric fatty acids, and the mixture may be reacted with polyamines to prepare a polyamide hardener. Alternatively, a polyamide hardener mixture may be prepared by adding one or more amide compounds which are obtained by the reactions between monomeric fatty acids and polyamines to one or more polyamides which are obtained separately by the reactions between polymeric fatty acids and polyamines.

Preferable alkylenepolyamines are ethyleneamines represented by the formula of $H_2N-(CH_2-CH_2-NH)_n-H$ where "n" is more preferably 3 to 5. The most preferable alkylenepolyamines are tetraethylenepentamine represented by the aforementioned formula where $n=4$, and pentaethylenehexamine represented by the same formula where $n=5$.

It is advisable to use a glycidyl type epoxy resin which is liquid at normal temperature and has a low viscosity, since an emulsion slurry may be conveniently prepared by the use of such an epoxy resin. Preferable epoxy resins are bisphenol-type epoxy resins including bisphenol-A and bisphenol-AD type epoxy resins. Particularly preferable epoxy resins are bisphenol type epoxy resins each having an epoxy equivalent ranging within 160 to 200.

Any known fillers may be used in the present invention without any particular restriction. However, it is preferred that the used filler can be bound by the used glycidyl type epoxy resin and that the used filler is an inorganic material which permits control of the particle size, the preferable examples being powders of silica stone and siliceous sand.

The emulsion slurry used in this invention may be added with a reactive diluent The reactive diluent is added to lower the viscosity of the emulsion slurry or to modify the properties of the hardened porous product. Examples of a reactive diluent which may be added to the emulsion slurry include allylglycidyl ether, butylglycidyl ether, styrene oxide, phenylglycidyl ether, cresylglycidyl ether, ethyleneglycol diglycidyl ether, neopentylglycol diglycidyl ether, 1,6-hexanediol diglycidyl ether and trimethylolpropane triglycidyl ether. The emulsion slurry used in the method of this invention may also be added with a hardening accelerator which acts to accelerate the rate of hardening or to improve the strength of the hardened product. Compounds which may be preferably added, as the accelerator, to the emulsion slurry include tertiary amines each having an aromatic ring, specific examples being benzyldimethylamine and 2,4,6-tris(dimethylaminomethyl)-phenol.

Since the porous material having open pores produced in accordance with the method of this invention is prepared by dispersing a filler in an emulsion comprised of a resin and water to obtain a slurry which is then hardened, the slurry used in the invention may be added with a dispersing agent for stabilizing the suspension of the filler, a surface reforming agent for reforming the surface of the filler to improve the binding affinity thereof at the interface between the resin and the filler, an emulsifer for forming a stable emulsion, and other additives such as surface active agents.

The present invention will now be described more in detail by referring to some experiments.

Table 1 shows a composition of a slurry prepared by adding a variety of hardeners to Epikote 815 (produced by Yuka Shell Epoxy K.K.), a glycidyl type epoxy resin. Various slurries having the composition as set forth in Table 1 and containing different hardeners were prepared and the functions of respective hardeners were empirically evaluated.

Initially, the effect of control of pore size attainable by "the method of changing the mixing ratio between monomeric fatty acid and the polymeric fatty acid" known from the technology disclosed in U.S. Pat. No. 4,464,485 was examined by the following experiment. In the experiment, tetraethylenepentamine was used as the ethyleneamine, oleic acid was used as the monomeric fatty acid, and Versadyme V216 (produced by Henkel Japan K.K.) was used as the polymeric fatty acid; and the three starting materials were mixed and reacted to synthesize a hardener. Nine hardeners were prepared by changing the mixing ratio of the monomeric fatty acid and the polymeric fatty acid. The nine hardeners are denoted by Nos. 1 to 9 in Table 2 and the mixing ratio (in wt %) of the monomeric fatty acid to the sum of the monomeric fatty acid and the polymeric fatty acid is set forth also in Table 2. Porous materials having open pores were produced in accordance with the method as disclosed by U.S. Pat. No. 4,464,485 while using the compositions as set forth in Table 1 and containing respectively one of the hardener Nos. 1 to 9. The properties of the thus produced porous materials are shown in Table 2.

TABLE 1

| Starting Material | Used Quantity (g) |
| --- | --- |
| Epikote 815 | 648 |
| Hardener | 218 |
| 2,4,6-Tris(diaminomethyl)Phenol*[1] | 18 |
| Siliceous Sand Powder*[2] | 2800 |
| Water | 1351 |

Note:
*[1]Hardening Accelerator
*[2]Particle Size: 5μ > 28%

TABLE 2

| Hardener No. | Monomeric Fatty Acid / Monomeric Fatty Acid + Polymeric Fatty Acid (wt %) | Average Pore Diameter (micron) | Percentage Contraction (%) |
| --- | --- | --- | --- |
| 1 | 0 | 1.5 | 0.12 |
| 2 | 20 | 1.7 | 0.14 |
| 3 | 40 | 2.0 | 0.12 |
| 4 | 50 | 2.1 | 0.15 |
| 5 | 60 | 2.2 | 0.13 |
| 6 | 65 | 3.5 | 0.24 |
| 7 | 70 | 5.0 | 0.39 |
| 8 | 75 | 10.9 | 0.85 |
| 9 | 80 | 8.8 | 1.5 |

The effect of control of pore size attainable by the method of this invention was compared with that of the known method as set forth in Table 2. In the following experiment conducted in accordance with the method of this invention, No. 4 hardener set forth in Table 2 was used as the polyamide hardener, triethylenetetramine which was one of primary amines was used as the polyamine hardener, and cresylglycidyl ether which was an epoxy compound having one epoxy ring in one molecule was used as the modifier. A modified polyamine hardener was synthesized by mixing triethylenetetramine and cresylglycidyl ether in a mixing molar ratio of 1:1. The total weight of the polyamide hardener and the modified polyamine hardener was equal to the used quantity of the hardener as set forth in Table 1, and the mixing ratio of the polyamide hardener to the modified polyamine hardener was varied. Porous materials having open pores were produced in accordance with the method of this invention while using the compositions as set forth in Table 1 and containing the hardener mixtures obtained by varying the mixing ratio of the polyamide hardener to the modified polyamine hardener. The properties of the thus produced porous materials are shown in Table 3.

TABLE 3

| Run No. | Modified Polyamine Hardener / Polyamide Hardener (wt %) | Average Pore Diameter (micron) | Percentage Contraction (%) |
| --- | --- | --- | --- |
| 1 | 0 | 1.5 | 0.12 |
| 2 | 5 | 1.8 | 0.15 |
| 3 | 10 | 2.9 | 0.13 |
| 4 | 15 | 4.5 | 0.18 |

TABLE 3-continued

| Run No. | Modified Polyamine Hardener<br>Polyamide Hardener (wt %) | Average Pore Diameter (micron) | Percentage Contraction (%) |
|---|---|---|---|
| 5 | 20 | 6.8 | 0.21 |
| 6 | 30 | 9.9 | 0.27 |
| 7 | 40 | 13.5 | 0.41 |
| 8 | 50 | 18.0 | 1.10 |

Another experiment was conducted to learn the effect of control of pore size attainable by the method of this invention. In this experiment, No. 4 hardener set forth in Table 2 was used as the polyamide hardener, and the used amine hardener was m-xylylenediamine which was one of the primary amines. The total weight of the polyamide hardener and the amine hardener was equal to the used quantity of the hardener as set forth in Table 1, and the mixing ratio of the polyamide hardener to the amine hardener was varied. Porous materials having open pores were produced in accordance with the method of this invention while using the compositions as set forth in Table 1 and containing the hardener mixtures obtained by varying the mixing ratio of the polyamide hardener to the amine hardener. The properties of the thus produced porous materials are shown in Table 4.

TABLE 4

| Run No. | Amine Hardener<br>Polyamide Hardener (wt %) | Average Pore Diameter (micron) | Percentage Contraction (%) |
|---|---|---|---|
| 1 | 0 | 1.5 | 0.12 |
| 2 | 5 | 1.7 | 0.11 |
| 3 | 10 | 2.0 | 0.15 |
| 4 | 15 | 3.1 | 0.14 |
| 5 | 20 | 4.5 | 0.14 |
| 6 | 30 | 5.9 | 0.16 |
| 7 | 40 | 7.7 | 0.17 |
| 8 | 60 | 10.0 | 0.21 |
| 9 | 100 | 14.9 | 0.43 |
| 10 | 140 | 9.9 | 1.20 |

A further experiment was conducted to learn the effect of control of pore size attainable by the method of this invention. In this experiment, No. 4 hardener set forth in Table 2 was used as the polyamide hardener, diethylenetriamine which is one of primary amines was used as the polyamine hardener, and the used modifier was ethyleneglycol diglycidyl ether which is an epoxy compound having two epoxy rings per molecule. The mixing ratio of diethylenetriamine to ethyleneglycl diglycidyl ether for the synthesis of the modified polyamine hardener was set to 1:0.5 in molar ratio. The total weight of the polyamide hardener and the modified polyamine hardener was equal to the used quantity of the hardener as set forth in Table 1, and the mixing ratio of the polyamide hardener to the modified polyamine hardener was varied. Porous materials having open pores were produced in accordance with the method of this invention while using the compositions as set forth in Table 1 and containing the hardener mixtures obtained by varying the mixing ratio of the polyamide hardener to the modified polyamine hardener. The properties of the thus produced porous materials are shown in Table 5.

TABLE 5

| Run No. | Modified Polyamine Hardener<br>Polyamide Hardener (wt %) | Average Pore Diameter (micron) | Percentage Contraction (%) |
|---|---|---|---|
| 1 | 0 | 1.5 | 0.12 |
| 2 | 0.2 | 1.5 | 0.12 |
| 3 | 0.5 | 1.3 | 0.11 |
| 4 | 1 | 1.1 | 0.15 |
| 5 | 2 | 0.9 | 0.15 |
| 6 | 5 | 0.7 | 0.19 |
| 7 | 10 | 0.5 | 0.19 |
| 8 | 15 | 0.2 | 0.29 |

Since the filler (siliceous sand powder) used in the experiment which was conducted while employing "the method of changing the mixing ratio between monomeric fatty acid and the polymeric fatty acid" and which gave the results shown in Table 2 had the same particle size as that of the filler used in the experiments which were conducted in accordance with the method of this invention and which gave the results as shown in Tables 3, 4 and 5, the results shown in Table 2 could be directly compared with the results shown in Tables 3, 4 and 5.

As can be seen from Table 2, when "the method o changing the mixing ratio between monomeric fatty acid and the polymeric fatty acid" is employed, the change in pore size is very little within the range where the ratio accounted for by the monomeric fatty acid is relatively small and thus the pore size is relatively small, even if the ratio of the monomeric fatty acid to the polymeric acid is changed. As a result, the average pore diameter cannot be lowered to less than 1.5 microns. On the other hand, when the ratio accounted for by the monomeric fatty acid exceeds about 60%, the pore size or pore diameter abruptly increases with attendant abrupt increase of the percentage contraction. In view of this result, the upper limit of the average pore diameter is considered to be about 5 microns when it is desired to produce a porous product having good dimensional accuracy.

In contrast thereto, as will be seen from the results shown in Tables 3, 4 and 5, when the method of this invention is adopted so that a modified polyamine hardener or an amine hardener is added to the polyamide hardener, the pore size may be effectively controlled by varying the mixing ratio of the polyamide hardener to the modified polyamine hardener or the amine hardener. As will be seen from the results shown in Tables 3 and 4, the average pore diameter increases as the ratio accounted for by the modified polyamine hardener or the amine hardener increases, and the percentage contraction or shrinkage of the hardened product does not become so large in the range within which the average pore diameter is not more than about 10 microns. On the other hand, the results shown in Table 5 reveal that the average pore diameter decreases as the ratio accounted for by the modified polyamine hardener increases, so that the average pore diameter can be decreased to about 0.2 micron by increasing the mixing ratio of the modified polyamine to about 15%.

In summary, it should be appreciated that the average pore diameter can be controlled within the range of 0.2 to 10 microns according to the method of this invention, this range being considerably wider than the range of 1.5 to 5 microns covered by "the method of changing the mixing ratio between monomeric fatty acid and the polymeric fatty acid". It should be thus understood that an open-cellular porous product having large and complicated shape can be produced with high dimensional accuracy while varying the pore size within a wide range, according to the method of this invention.

Meanwhile, the pore size or pore diameter generally increases as the ratio of the modified polyamine hardener and/or amine hardener to the polyamide hardener increases. However, by the use of special kinds of modified polyamine hardeners, the reverse tendency is found as in the cases shown in Table 5. Typical examples of modified polyamine hardeners revealing such function are those prepared by modifying straight or branched chain aliphatic polyamines, such as diethylenetriamine, triethylenetetramine, tetraethylenepentamine and pentaethylenehexamine, with modifiers each having plural epoxy rings in one molecule, such as ethyleneglycol diglycidyl ether, neopentylglycol diglycidyl ether, 1,6-hexanediol diglycidyl ether and trimethylolpropane triglycidyl ether.

Preferable mixing ratio of the amine hardener and/or modified polyamine hardener is defined to be 0.5 to 100 parts by weight, based on 100 parts by weight of the polyamide hardener. The reason for defining the upper limit to be 100 parts by weight is that the contraction or shrinkage of the hardened product becomes too high when the mixing ratio of the amine hardener and/or modified polyamine hardener is more than 100 parts by weight. The reason for defining the lower limit to be 0.5 part by weight is that the effect for controlling the pore size or pore diameter is not clearly appreciable when the mixing ratio of the amine hardener and/or modified polyamine hardener is less than 0.5 part by weight.

Table 6 shows a composition of a slurry prepared by adding a variety of hardeners each containing 100 parts by weight of Tohmide 245S (produced by Fuji Kasei Kogyo K.K.) which is a polyamide hardener and x parts by weight of a modified polyamine hardener and/or amine hardener to Epomik R-710 (produced by Mitsui Petrochemical Ind. K.K.) which is a glycidyl type epoxy resin. Functions of various hardeners added with an amine hardener and/or modified polyamine hardener were empirically evaluated while using various slurries each having the composition as set forth in Table 6 and containing different hardeners varied by changing the added amine hardener and/or modified polyamine hardener.

TABLE 6

| Starting Material | Used Quantity |
| --- | --- |
| Epomik R-710 | 589 |
| Tohmide 245S | $222 \times \frac{100}{100 + x}$ |
| Modified Polyamine Hardener or Amine Hardener | $222 \times \frac{x}{100 + x}$ |
| Butylglycidyl Ether[1] | 59 |
| 2,4,6-Tris(diaminomethyl)phenol | 14 |
| Siliceous Sand Powder[2] | 2800 |
| Water | 1351 |

Note:
[1]Reactive Diluent
[2]Particle Size: $5\mu > 29\%$

The following experiment was conducted to learn the properties of the hardened products varied by the change in mixing ratio between a polyamine hardener and a modifier used in the synthesis of a modified polyamine hardener. The used polyamine hardener was m-phenylenediamine which is one of the primary amines, and the used modifier was phenylglycidyl ether which is an epoxy compound having one epoxy ring in one molecule. Five modified polyamine hardeners (Nos. 1 to 5) were prepared by changing the mixing ratio of m-phenylenediamine to phenylglycidyl ether. Each of the Nos. 1 to 5 hardeners as set forth in the following Table 7 was used as the modified polyamine hardener in the composition shown by Table 6 where x was set to 20, and a porous product having open pores was produced in accordance with the method of this invention. The properties of the thus produced porous products and the viscosities of the used hardeners under the condition of 30° C. are shown in Table 7.

TABLE 7

| Hardener No. | Mixing Ratio of Phenylglycidyl Ether to m-Phenylenediamine (molar ratio) | Average Pore Diameter (micron) | Percentage Contraction (%) | Viscosity of Hardener |
| --- | --- | --- | --- | --- |
| 1 | 0:100 | 5.0 | 0.15 | solid |
| 2 | 8:100 | 6.0 | 0.11 | 220 cp |
| 3 | 30:100 | 7.1 | 0.10 | 6000 cp |
| 4 | 50:100 | 8.3 | 0.13 | 48000 cp |
| 5 | 100:100 | 5.3 | 0.11 | highly viscous (gluey) |

As can be seen from the results shown in Table 7, the average pore size or pore diameter increases as the molar ratio of phenylglycidyl ether to m-phenylenediamine is increased until the molar ratio reaches about 0.5:1. It is thus understood that the pore size can be controlled by varying the mixing ratio between the polyamine hardener and the modifier. Another important feature is that the viscosity of the hardener becomes higher as the ratio accounted for by the modifier is increased. Accordingly, it is preferred to use a modified polyamine hardener which is prepared from a mixture containing a smaller amount of a modifier, when a hardener having a low viscosity should be used in the preparation of the emulsion slurry. It is to be noted here that difficulties are encountered when aromatic amines, such as m-phenylenediamine, are used as one of the starting materials for the emulsion slurry, since they are generally solid at room temperature. It is, therefore, preferred that such amines be used after they are reacted with modifiers to form modified polyamines.

Another experiment was conducted to learn the functions or effects of various modified polyamine hardeners and amine hardeners while using the following five hardeners (Nos. 1 to 5 as will be described below). Porous products having open pores were produced while using the compositions prepared in accordance with the formulation as set forth in Table 6. The properties of the thus produced porous products are shown in the following Table 8. The used quantity (part by weight) of each modified polyamine hardener or amine hardener, which is denoted by x in Table 6, is also set forth in Table 8. In Table 8, also shown are the results of a comparative run wherein a polyamide hardener was used singly, namely the case where x=0.

Run No. 1 is an experiment where a secondary amine was used as the amine hardener. The specific amine hardener used in this run was pyrrolidine.

Run No. 2 is an experiment where a tertiary amine was used as the amine hardener. The specific amine hardener used in this run was pyriiine.

Run No. 3 is an experiment where a modified secondary polyamine hardener was used as the modified polyamine hardener. The specific modified polyamine hardener used in this run was a reaction product obtained by the reaction of a mixture containing N-methylpiperadine and cresylglycidyl ether in a mixing molar ratio of 1:1.

Run No. 4 is an experiment where acrylonitrile was used as the modifier. The specific modified polyamine hardener used in this run was a reaction product obtained by the reaction of a mixture containing m-xylylenediamine and acrylonitrile in a mixing molar ratio of 1:1.

Run No. 5 is an experiment where a mixture of a phenol and formaldehyde was used as a modifier to synthesize a Mannich-type reaction product which was used as the modified polyamine hardener. The specific modified polyamine hardener used in this run was a reaction product obtained by the reaction of a mixture containing m-xylylenediamine, p-cresol and formaldehyde in a mixing molar ratio of 1:1:1.

TABLE 8

| Run No. | x | Average Pore Diameter (micron) | Percentage Contraction (%) |
|---|---|---|---|
| 1 | 3.5 | 7.0 | 0.15 |
| 2 | 10 | 6.2 | 0.29 |
| 3 | 5 | 6.8 | 0.27 |
| 4 | 20 | 7.1 | 0.24 |
| 5 | 30 | 4.5 | 0.25 |
| C* | 0 | 2.1 | 0.16 |

*Note: C means Comparative run.

As can be appreciated from Table 8, the pore size can be increased by the addition of any one of the hardeners used in Run Nos. 1 to 5. Meanwhile, it has been generally found that the effect of increasing the pore size or pore diameter resulting from the addition of a secondary amine hardener, a tertiary amine hardener or a modified polyamine hardener obtained by modifying a secondary amine hardener is higher than the same effect resulting from the addition of a primary amine hardener or a modified polyamine hardener obtained by modifying a primary amine with an epoxy compound having one epoxy ring per molecule, when the added amount is same. The same effect resulting from the addition of a modified polyamine hardener obtained by modifying with acrylonitrile is approximately equivalent to that resulting from the addition of a primary amine hardener or a modified polyamine hardener obtained by modifying a primary amine with an epoxy compound having one epoxy ring per molecule and the same effect resulting from the addition of a Mannich-tye reaction product is lower than that resulting from the addition of a primary amine hardener or a modified polyamine hardener obtained by modifying a primary amine with an epoxy compound having one epoxy ring per molecule.

The present invention will now be described more specifically with reference to some examples thereof.

EXAMPLES

Each of the compositions as set forth in Table 9 was put into a stainless steel container having no lid, and vigorously agitated at room temperature for 10 minutes to obtain a unfirom emulsion slurry. The emulsion slurry was cast in a water-impermeable mold and the mold was covered with a polyvinylchloride sheet to prevent drying of the slurry. The container was allowed to stand for 24 hours in a hardening chamber maintained at 45° C. to harden the slurry while it contained water. The hardened mass was removed from the mold, and then allowed to stand for 24 hours in a drying chamber maintained at 50° C., whereby a porous product having open pores was obtained. The properties of the thus obtained porous products are shown in Table 10. Meantime, the production processes of the respective hardeners as set forth in Table 9 are described in the Footnote to Table 9, and the methods for the determination of the properties as shown in Table 10 are described in the Footnote of Table 10.

TABLE 9

| Material Used | Example No. | | | | | | | |
|---|---|---|---|---|---|---|---|---|
| | 1 (g) | 2 (g) | 3 (g) | 4 (g) | 5 (g) | 6 (g) | 7 (g) | 8 (g) |
| Epikote 815*[1] | 648 | 648 | 648 | 648 | 648 | 648 | 648 | 648 |
| Polyamide Hardener*[2] | 212 | 202 | 203 | 189 | 183 | 183 | 202 | 191 |
| Pyrrolidine*[3] | 10 | 5 | | | | | | |
| Modified Polyamine Hardener A*[4] | | 15 | | | | | | |
| Modified Polyamine Hardener B*[5] | | | 9 | | | | | |
| m-Xylylenediamine*[6] | | | 10 | 33 | 39 | | | |
| Modified Polyamine Hardener C*[7] | | | | | | 39 | 10 | |
| Modified Polyamine Hardener D*[8] | | | | | | | 10 | 31 |
| 2,4,6-Tris(diaminomethyl)phenol*[9] | 14 | 14 | 14 | 14 | 14 | 14 | 14 | 14 |
| Siliceous Sand Powder | 2800 | 2800 | 2800 | 2800 | 2800 | 2800 | 2800 | 2800 |

TABLE 9-continued

| Water | 1351 | 1351 | 1351 | 1351 | 1351 | 1351 | 1351 | 1351 |
|---|---|---|---|---|---|---|---|---|

Note:
*[1] A glycidyl type epoxy resin (produced by Yuka Shell Expoxy K.K.)
*[2] This polyamide hardener was synthesized by the following process. A stainless steel container was charged with 1608 g of tetraethylenepentamine, 1196 g of oleic acid (NNA35 produced by Nippon Oils and Fats Co., Ltd.) and 1196 g of a polymeric fatty acid (Versadyme V216 produced by Henkel Japan K.K.). Under agitation in a nitrogen atmosphere, the contents in the container were reacted by raising the temperature thereof from room temperature to 230° C. over a period of 2 hours and heating at 230 to 240° C. for additional 2 hours.
*[3] An amine hardener.
*[4] The Modified Polyamine Hardener A was synthesized through the following process. A glass container having no lid was charged with 136 g of m-xylylenediamine and 164 g of cresylglycidyl ether. Under agitation, the contents in the container were reacted by raising the temperature thereof from room temperature to 60° C. over a period of 2 hours and then from 60° C. to the maximum temperature of 97° C. over a period of 15 minutes to obtain the Modified Polyamine Hardener A.
*[5] The Modified Polyamine Hardener B was synthesized through the following process. A glass container having no lid was charged with 130 g of m-phenylenediamine which had been melted at 70° C., and then added with 137 g of allylglycidyl ether under agitation. The contents in the container were reacted by raising the temperature thereof to the maximum temperature of 80° C. over a period of 90 minutes to obtain the Modified Polyamine Hardener B.
*[6] An amine hardener.
*[7] The Modified Polyamine Hardener C was synthesized through the following process. A glass container having no lid was charged with 146 g of triethylenetetramine and 108 g of neopentylglycol diglycidyl ether. Under agitation, the contents in the container were reacted by raising the temperature thereof from room temperature to 80° C. over a period of 40 minutes and then from 80° C. to the maximum temperature of 99° C. over a period of 5 minutes to obtain the Modified Polyamine Hardener C.
*[8] The Modified Polyamine Hardener D was synthesized through the following process. A glass container having no lid was charged with 124 g of diethylenetriamine and 104 g of ethyleneglycol diglycidyl ether. Under agitation, the contents in the container were reacted by raising the temperature thereof from room temperature to 90° C. over a period of 30 minutes and then from 90° C. to the maximum temperature of 200° C. over a period of 5 minutes to obtain the Modified Polyamine Hardener D.
*[9] A hardening accelerator.
*[10] A powder obtained by pulverizing a siliceous sand generally used in the production of glass (produced by Nippo Keisa Kogya K.K.) to a particle size of $5\mu > 30\%$.

TABLE 10

| Example No. | Average Pore Diameter*[1] (micron) | Percentage Contraction*[2] (%) | Wet Bending Strength*[3] (kg/cm$^2$) | Porosity*[4] (%) |
|---|---|---|---|---|
| 1 | 10.4 | 0.20 | 72.1 | 40.7 |
| 2 | 8.5 | 0.15 | 69.9 | 41.0 |
| 3 | 6.2 | 0.13 | 70.5 | 40.9 |
| 4 | 4.5 | 0.11 | 69.9 | 40.8 |
| 5 | 3.0 | 0.14 | 68.5 | 41.0 |
| 6 | 1.5 | 0.13 | 70.3 | 41.2 |
| 7 | 0.6 | 0.17 | 70.1 | 41.1 |
| 8 | 0.2 | 0.21 | 71.5 | 40.8 |

Note:
*[1] After completely drying the porous material having open pores, the pore diameter distribution was measured using a mercury press-feeding porosimeter, and the average pore diameter was calculated by taking the mean point of 50% of the cumulative pore volume.
*[2] An FRP case measuring 50 mm (length) × 50 mm (width) × 500 mm (height) and having contraction marks formed at 450 mm intervals was used as the water-impermeable mold. The hardened product was taken out of the case, and the heightwise linear contraction rate was measured from the contraction marks left on the hardened porous product. The percentage contraction was calculated from the thus measured contraction rate.
*[3] A 15 mm × 15 mm × 120 mm polyvinylchloride case was used as the water-impermeable mold, and the hardened mass was saturated with water to be used as a test piece. The test piece was subjected to a bending test conducted at a span distance of 100 mm and a head speed of 2.5 mm/min.
*[4] The same test piece as used in the test for determining the wet bending strength was fully dried, and the weight loss due to evaporation of water was measured. The porosity is indicated by the apparent porosity calculated by subtracting the weight of the dried test piece from the weight of the wet test piece.

As can be seen from the results of Examples 1 to 8 shown in Table 10, the average pore diameter can be adjusted within a range of from about 0.2 to 10 microns without causing significant increase in percentage contraction or shrinkage while using the same siliceous sand powder having the same particle size, according to the present invention.

As has been described hereinbefore, the present invention provides a method of producing a porous product having open pores having an average pore diameter of from 0.2 to 10 microns, and having a large and complicated shape with good accuracy in dimension.

What is claimed is:

1. A method of producing a porous material having open pores, comprising the steps of:

(a) preparing an emulsion slurry by vigorously agitating a mixture comprising (i) a glycidyl type epoxy resin, (ii) a first hardener selected from the group consisting of modified polyamine hardeners each being prepared by modifiying a polyamine hardener with a modifier selected from the group consisting of epoxy compounds having one epoxy ring, two epoxy ring or three epoxy rings per molecule, acyrlonitrile and combinations of formaldehyde and a phenolic compound, amine hardeners and mixtures thereof, (iii) a second hardener selected from the group consisting of polyamide hardeners, (iv) a filler and (v) water;

(b) casting said slurry in a water-impermeable mold; and (c) hardening said slurry while it contains water.

2. The method of producing a porous material having open pores according to claim 1, wherein said polyamine hardeners are primary amine hardeners each having at least one primary amine group per molecule, or secondary amine hardeners each having at least one secondary amine group per molecule and having no primary amine group.

3. The method of producing a porous material having open pores according to claim 1, wherein said modifier is an epoxy compound having at least one epoxy ring per molecule.

4. The method of producing a porous material pores according to claim 1, wherein said modifier is acyrlonitrile.

5. The method of producing a porous material having open pores according to claim 1, wherein said modifier is a mixture of a phenol and formaldehyde, and each of said modified polyamine hardeners is a Mannich-type reaction product.

6. The method of producing a porous material having open pores according to claim 1, wherein said amine hardeners are primary amine hardeners each having at least one primary amine group per molecule, or secondary amine hardeners each having at least one secondary amine group per molecule and having no primary amine group, or tertiary amine hardeners each having at least one tertiary amine group per molecule and having no primary and secondary amine group.

7. The method of producing a porous material having open pores according to claim 1, wherein each of said polyamide hardeners is either:
  (i) a mixture of (a) an amide compound which is obtained through a reaction between a monomeric fatty acid and an ethyleneamine represented by the formula of $H_2N-(CH_2-CH_2-NH)_n-H$ where "n" be 3 to 5, and (b) a polymeric fatty acid polyamide obtained through a reaction of a polymeric fatty acid and said ethyleneamine; or
  (ii) a reaction mixture obtained by reaction of a mixture of said monomeric fatty acid, said polymeric fatty acid and said ethyleneamine.

8. The method of producing a porous material having open pores according to claim 1, wherein the mixing ratio of the sum of the modified polyamine hardener and amine hardener to the polyamide hardener is 0.5 to 100 parts by weight to 100 parts by weight.

9. The method of producing a porous material having open pores according to claim 1, wherein said mixture for forming said emulsion slurry further contains a reactive diluent which lowers the viscosity of said emulsion slurry, a hardening accelerator which acts to accelerate the rate of hardening or to improve the strength of the hardened product and/or a mixture thereof.

10. The method of producing a porous material having open pores according to claim 1, wherein said modifier of an epoxy compound containing one epoxy ring per molecule is allylglycidyl ether, butylglycidyl ethyer, styrene oxide, ethylene oxide, glycidyl methacrylate, octylene oxide, cyclohexenevinyl monoxide, t-carboxylic acid glycidyl ester, 3-(pentadecyl)phenyl-glycidyl ether, dipentene monoxide, butylphenylglycidyl ether, pinene oxide, propylene oxide, phenylglycidyl ether or cresylglycidyl ether.

11. The method of producing a porous material having open pores according to claim 1, wherein said modifier of an epoxy compound having two epoxy rings per molecule is ethyleneglycol diglycidyl ether, neopentylglycol diglycidyl ether, 1,6-hexanediol diglycidyl ether, vinylcyclohexene dioxide, resorcinoldiglycidyl ether, propyleneglycol diglycidyl ether, butadiene oxide, dimethylpentane dioxide or bisphenol-A diglycidyl ether.

12. The method of producing a porous material having open pores according to claim 1, wherein said modifier of an epoxy compound haivng three epoxy rings per molecule is trimethylolprpoane triglycidyl ether or 2,6-diglycidyl phenylglycidyl ether.

13. The method of producing a porous material having opening pores according to claim 1, wherein the polyamine of said modified polyamine hardener is an amine selected from the group consisting of diethylenetriamine, triethylenetetramine, tetraethylenepentamine, pentaethylenehexamine, iminobispropylamine, bis(hexamethylene)triamine, aminoethylethanolamine, dimethylaminopropylamine, diethylaminopropylamine, methyliminobispropylamine, 1,3-diaminocyclohexane, tetrachloro-p-xylylenediamine, menthenediamine, isophoronediamine, N-aminoethylpiperizine, diaminodiphenyl ether, benzidine, 4,4'-bis(o-toluidine), 4,4'-thiodianiline, m-xylylenediamine, m-phenylenediamine, o-phenylenediamine, dianisidine, methylenebis(o-chloroaniline), 2,4-toluenediamine, bis(3,4-diaminophenyl)sulfone, diaminodiphenylmethane, diaminodiphenylsulfone, diaminoditolysulfone, 2,6-diaminopyridine, 4-chloro-o-phenylenediamine, 4-methoxy-6-methyl-m-phenylenediamine, m-aminobenzylamine, N-methylpiperazine and hydroxyethylpiperazine.

14. The method of producing a porous material having open pores according to claim 1, wherein the amine hardener ingredient of said first hardener is a member selected from the group consisting of primary amines each having at least one primary amine group per molecule, secondary amines each having at least one secondary amine group per molecule although containing no primary amine group and tertiary amines each having at least one tertiary amine group although having no primary or secondary amine group.

15. The method of producing a porous material having open pores according to claim 1, wherein said primary amine hardener is diethylenetriamine, triethylenetetramine, tetraethylenepentamine, pentaethylenehexamine, diethylaminopropylamine, menthenediamine, N-aminoethylpiperazine, m-xylylenediamine, m-phenylenediamine, o-phenylenediamine, diaminodiphenylmethane, or diaminodiphenylsulfone.

16. The method of producing a porous material having open pores according to claim 1, wherein said secondary amine hardener is N-methylpiperazine, hydroxyethylpiperazine, piperidine, pyrrolidine or morpholine.

17. The method of producing a porous material having open pores according to claim 1, wherein said tertiary amine hardner is N,N'dimethylpiperazine, N,N,N',N'-tetramethyl-1,3-butanediamine, pyridine, triethanolamine, dialkylaminoethanol, N-methylmorpholine, hexamethylenetetramine, pyrazine, benzyldimethylamine, 2-(dimethylaminomethyl)phenyl, quinoline or 1-hydroxyethyl-2-heptadecylglyoxalidine.

18. The method of producing a porous material having open pores according to claim 1, which further comprsiing drying said hardened slurry.

19. The method of producing a porous material having open pores according to claim 9, wherein said reactive diluent is allyglycidyl ether, butylglycidyl ether, styrene oxide, phenylglycidyl ether, cresylglycidyl ether, ethyleneglycoldiglycidyl ether, neopentylglycoldiglycidyl ether, 1,6-hexanedioldiglycidyl ether or trimethylolpropanetriglycidyl ether.

* * * * *

UNITED STATES PATENT AND TRADEMARK OFFICE
CERTIFICATE OF CORRECTION

PATENT NO. : 4,828,771
DATED : MAY 09, 1989
INVENTOR(S) : NOBORU KISHIMA

It is certified that error appears in the above-identified patent and that said Letters Patent is hereby corrected as shown below:

On the Title Page, Item [30]. Please correct the date of the Foreign Application Priority Data:

--Sep. 17, 1986 [JP] Japan.................61-218626--

Signed and Sealed this

Ninth Day of January, 1990

Attest:

JEFFREY M. SAMUELS

Attesting Officer     Acting Commissioner of Patents and Trademarks